No. 704,453. Patented July 8, 1902.
W. MacN. FAIRFAX.
MEANS FOR CHANGING THE TENSION OF CURRENTS.
(Application filed Oct. 11, 1892.)
(No Model.)
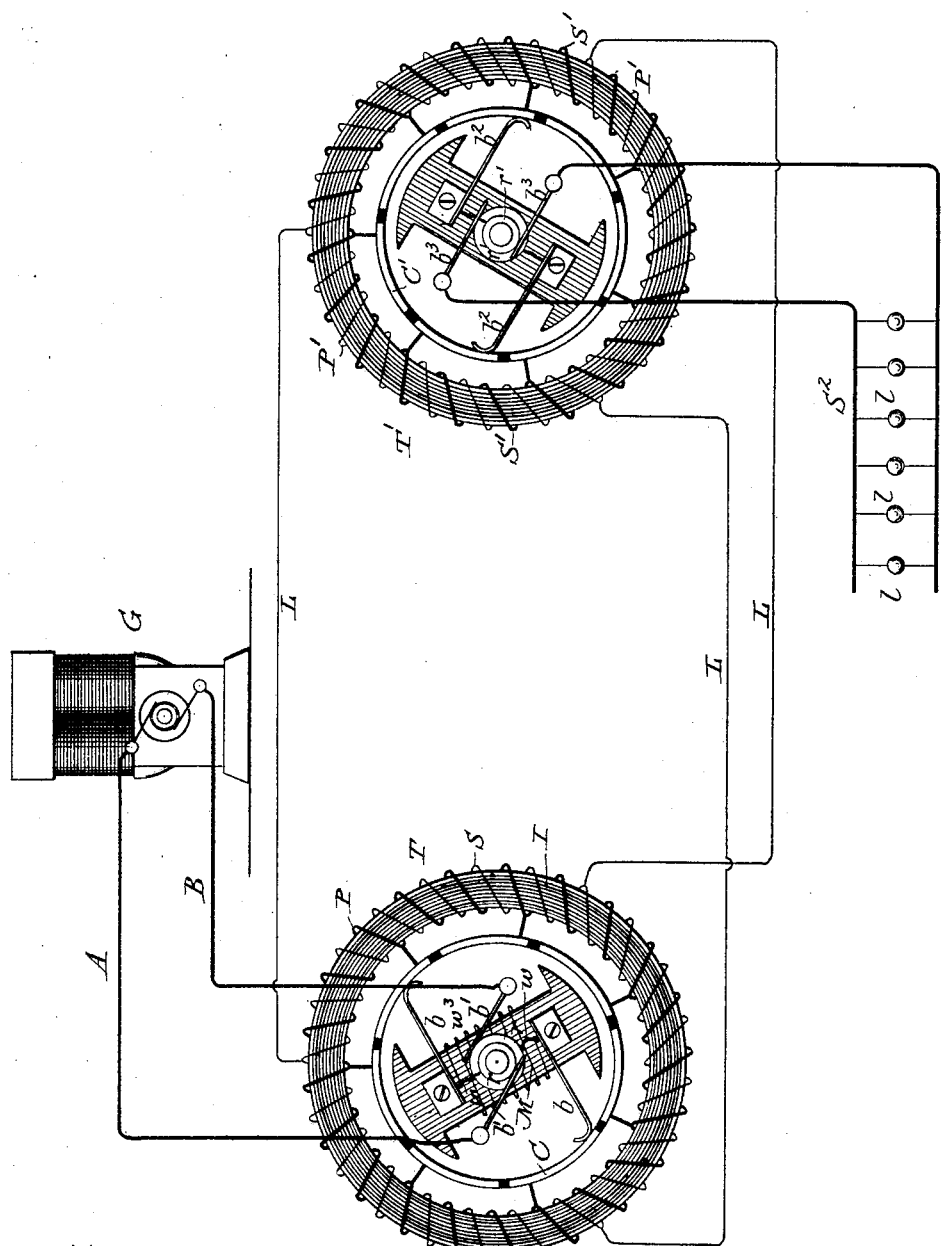
Witnesses:
Inventor:

UNITED STATES PATENT OFFICE.

WILLIAM MacNEILL FAIRFAX, OF BROOKLYN, NEW YORK.

MEANS FOR CHANGING THE TENSION OF CURRENTS.

SPECIFICATION forming part of Letters Patent No. 704,453, dated July 8, 1902.

Application filed October 11, 1892. Serial No. 448,612. (No model.)

*To all whom it may concern:*

Be it known that I, WILLIAM MACNEILL FAIRFAX, a citizen of the United States, residing in Brooklyn, in the county of Kings and State of New York, have invented certain new and useful Improvements in Means for Changing the Tension of Currents, of which the following is a specification.

My invention relates to means by which a low-tension current can be changed into a high-tension alternating current and conveyed to a distance and there reconverted into a low-tension current, the circuits and connections by which the high-tension alternating current is induced and transmitted being unchanged during the operation of the apparatus. The advantages of such a system are obvious, because I am enabled to convert a low-tension current into a high-tension alternating current and maintain the high-tension circuits and connections unchanged. This is of special importance in high-tension circuits, because any change of connection during the operation of the system causes sparking and also renders it difficult to properly and safely insulate the high-tension circuit. This is a matter of prime importance in high-tension long-distance transmission. I am also enabled to reconvert said current into a low-tension current without any interference with the high-tension circuits and connections.

The drawing is a diagrammatic illustration of a system embodying my invention.

G is a generator of low-tension continuous current. A B is a circuit connected to the said generator. This circuit may contain translating devices, arranged either in parallel arc or in series.

T is a rotary transformer. P is the primary coil of this transformer.

S is the secondary coil of the transformer.

I is the core of the transformer. The core of the transformer is composed of soft iron, preferably laminated.

C is a commutator, to which the primary coils P are connected, as the coils of the Gramme ring are connected to its commutator.

$b\ b$ are the commutator-brushes, which pass over the commutator C. These brushes are carried by a rotating magnetic body M, and said brushes are connected, respectively, to two rings $r\ r$, which are carried by the magnetic body. Upon these rings rest brushes $b'\ b'$, which are stationary brushes. These brushes $b'\ b'$ are connected to the circuit A B. The magnetic body M is either a permanent magnet or an electromagnet, having either series, shunt, or compound windings, as may be desired—that is, this winding on the magnetic body M is connected in various ways to the wires connecting the rings $r\ r$ with the moving brushes $b\ b$. These connecting-wires I designate by $w$ and windings on the magnetic body M by $w^2$, $w^3$, or $w^4$, according to whether it is a series, a shunt, or compound winding. The brushes $b$, which are carried by the magnetic body M, are placed at an angle to the poles of the magnetic body M. In this way it is obvious that the poles of the rotary transformer are placed at an angle to the poles of the rotating magnetic body M, because the current enters at the points where the moving brushes $b$ rest upon the commutator. In this way as the poles of the magnetic field are always in advance of the poles of the magnetic body they will draw the magnetic body after them, and thus cause the rotation of said body, thereby maintaining as long as current is supplied to the rotary transformer a continuous rotation of the magnetic body M. As the poles of the transformer are continually moving forward through its core, the lines of force from said rotating field will cut the coils of the secondary circuit S, thereby creating in said secondary circuit S currents, and as the polar points move through the coils S it is obvious that the maximum points of difference of potential rotate, thereby producing differences of phase in the currents produced in the different parts of the circuit S. Now if we connect the three equidistant points of this secondary circuit to three interconnected line-wires or circuits L L we will have currents differing in phase by one hundred and twenty degrees from each other flowing in said line-wires due to the movement of the polar points through the coils S of the rotary transformer T, which transformer therefore serves as a producer of successively-acting magnetomotive forces in its own core, successively-produced electromotive forces, and resultant three-phase currents in the interconnected circuits L L L, extending to a distant point or points, where, for example, the receiver T' is located. If these three line-wires L L L are connected to corresponding equidistant points of another winding P' on another or receiving transformer, a rotating magnetic field or series of successively-acting magnetomotive forces will be produced in the core of this other transformer or receiver T', which rotating magnetic field will create in another coil S', wound on the core of the second transformer T', currents which, if S' is connected to commutator C' similar to C, will be carried off as continuous currents by rotating brushes $b^2$, which correspond to brushes $b$ in the transformer T. The two windings, the commutator, the core, the rotating magnetic body, the rotating brushes, and the windings in the two transformers are similar. If the rotating brushes in T' take off a current which is led to rings $r'$ $r'$ and which are there taken off by brushes $b^3$ $b^3$, we would have continuous currents in a local secondary circuit $S^2$, which supplies translating devices—for example, lamps $l$—which, as shown, are arranged in parallel. If the winding S on the transformer T is of many turns of fine wire and if the corresponding winding P' on T' is also of many turns of fine wire, we would transmit a very high tension current from the transformer T to the transformer T', and thus reduce it to a low-tension continuous current at the transformer T', which can be used to supply lamps or other similar devices $l$. In this way I attach my apparatus to any point of a low-tension-current system and convert the low-tension currents into high-tension alternating currents and convey said high-tension alternating currents to a distant point and there reconvert them into low-tension currents, which can be utilized in any desired manner. In this way I avoid all moving connections in the high-tension circuits and maintain constant connections therein, thereby avoiding all dangers due to breaking high-tension circuits.

I have referred to the transforming apparatus T and T' in my original specification and claims as "changers of the character of the currents." By this I have intended to indicate apparatus which changes the nature or type of the current. It will be noticed that the functions performed by the two transforming apparatus T and T' are the converse of each other—namely, T changes the character of the current, for example, from continuous to three-phase alternating currents, while T' changes, for example, the three-phase alternating currents into currents of another character—that is, continuous currents. The transforming devices T and T', it will be noticed, also perform the additional function of changing the tension of the currents—for example, the first from low-tension continuous to high-tension three-phase alternating and the second from high-tension three-phase alternating to low-tension continuous currents.

A very important advantage is gained by having to use only three line-wires, which, according to the well-known mathematical demonstration, have been shown as capable of carrying substantially as much energy as two wires connected in any other system using the same or a greater amount of copper. In other words, I do not need to use any more copper than would ordinarily be used for transmitting high-tension continuous currents or alternating currents over two line-wires.

By an interconnected three-phase system the losses in transmission are a minimum and a minimum amount of copper is required.

I claim—

1. In a system of electrical generation, transmission and distribution, the combination of a generator of continuous currents, a local circuit or circuits connected thereto, a transformer having a stationary core and stationary primary and secondary coils, the primary coils being connected to a local circuit, and the secondary coils being normally permanently connected to interconnected three-phase transmission-leads, a rotary commutating device electrically connected to the primary coils for producing successively-acting magnetomotive forces in the stationary core of the transformer, thereby producing successively-acting electromotive forces in the secondary coils of the transformer which result as three-phase currents in the interconnected transmission-leads, a transformer with stationary core and primary and secondary coils located at a distant station, the primary coils thereof being permanently connected to the interconnected three-phase transmission-leads, and a rotary commutating device which changes the successively-produced electromotive forces in the secondary coils into direct currents in the secondary circuits at the distant station, substantially as described.

2. In a system of electrical generation, transmission and distribution, the combination of a generator of low-tension continuous currents, a local circuit or circuits connected thereto, a transformer having a stationary core and stationary low-tension primary and high-tension secondary coils, the primary coils being connected to a local circuit, and the secondary coils being normally permanently connected to interconnected three-phase transmission-leads, a rotary commutating device electrically connected to the primary coils for producing successively-acting magnetomotive forces in the stationary core of the transformer, thereby producing successively-acting electromotive forces in the secondary coils of the transformer which result as three-phase currents in the interconnected transmission-leads, a transformer with stationary core and primary and secondary coils located at a distant station, the primary coils thereof being permanently connected to the interconnected three-phase transmission-leads, and a rotary commutating device which changes the successively-produced electromotive forces in the secondary coils into direct currents in the secondary circuits at the distant station, substantially as described.

3. In a system of electrical generation, transmission and distribution, the combination of a generator of continuous currents, a local circuit or circuits connected thereto, a transformer having a stationary core and stationary primary and secondary coils, the primary coils being connected to a local circuit, and the secondary coils being normally permanently connected to interconnected three-phase transmission-leads, a rotary commutating device electrically connected to the primary coils for producing successively-acting magnetomotive forces in the stationary core of the transformer, thereby producing successively-acting electromotive forces in the secondary coils of the transformer which result as three-phase currents in the interconnected transmission-leads, a transformer with stationary core and high-tension primary and low-tension secondary coils located at a distant station, the primary coils thereof being permanently connected to the interconnected three-phase transmission-leads, and a rotary commutating device which changes the successively-produced electromotive forces in the secondary coils into direct currents in the low-tension secondary circuits at the distant station, substantially as described.

4. In a system of electrical generation, transmission and distribution, the combination of a generator of continuous currents, a local circuit or circuits connected thereto, a transformer having a stationary core and stationary primary and closed-circuited secondary coils, the primary coils being connected to a local circuit, and the secondary coils being normally permanently connected to interconnected three-phase transmission-leads, a rotary commutating device electrically connected to the primary coils for producing successively-acting magnetomotive forces in the stationary core of the transformer, thereby producing successively-acting electromotive forces in the secondary coils of the transformer which result as three-phase currents in the interconnected transmission-leads, a transformer with stationary core and closed-circuited primary and secondary coils located at a distant station, the primary coils thereof being permanently connected to the interconnected three-phase transmission-leads, and a rotary commutating device which changes the successively-produced electromotive forces in the secondary coils into direct currents in the secondary circuits at the distant station, substantially as described.

WILLIAM MACNEILL FAIRFAX.

Witnesses:
C. M. BROOKE,
C. F. SINSNER.